(12) United States Patent
Sim

(10) Patent No.: US 10,978,690 B2
(45) Date of Patent: Apr. 13, 2021

(54) RECHARGEABLE BATTERY HAVING FIXING TERMINAL AND BATTERY MODULE USING THE SAME

(71) Applicant: Samsung SDI Co., Ltd., Yongin-si (KR)

(72) Inventor: In-Bo Sim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1066 days.

(21) Appl. No.: 14/814,410

(22) Filed: Jul. 30, 2015

(65) Prior Publication Data

US 2016/0072117 A1 Mar. 10, 2016

(30) Foreign Application Priority Data

Aug. 25, 2014 (KR) .................. 10-2014-0110963

(51) Int. Cl.
*H01M 2/06* (2006.01)
*H01M 2/20* (2006.01)
*H01M 2/30* (2006.01)

(52) U.S. Cl.
CPC .............. *H01M 2/30* (2013.01); *H01M 2/06* (2013.01); *H01M 2/202* (2013.01)

(58) Field of Classification Search
None
See application file for complete search history.

(56) References Cited

U.S. PATENT DOCUMENTS

| 2006/0270286 | A1* | 11/2006 | Zhao | H01M 2/206 439/840 |
| 2012/0100420 | A1* | 4/2012 | Byun | H01M 2/202 429/179 |
| 2012/0288744 | A1 | 11/2012 | Guen | |
| 2013/0149919 | A1* | 6/2013 | Lee | H01G 9/26 439/765 |
| 2015/0228959 | A1 | 8/2015 | Minamigata et al. | |

FOREIGN PATENT DOCUMENTS

| JP | 2012-079456 A | 4/2012 |
| JP | 2014-072068 | 4/2014 |
| KR | 10-2010-0114595 A | 10/2010 |
| KR | 10-2012-0125874 | 11/2012 |
| KR | 10-2013-0063837 | 6/2013 |

OTHER PUBLICATIONS

Office Action dated Nov. 23, 2020 in corresponding Korean patent application No. 10-2014-0110963, 8 pp.

* cited by examiner

*Primary Examiner* — Haixia Zhang
(74) *Attorney, Agent, or Firm* — Knobbe, Martens, Olson & Bear, LLP

(57) ABSTRACT

A rechargeable battery according to one aspect of the present invention includes: an electrode assembly including a first electrode, a second electrode, and a separator; a case for accommodating the electrode assembly; a first lower terminal protruding out of the case and electrically coupled to the first electrode; and a first fixing terminal installed to be movable with respect to the first lower terminal.

18 Claims, 13 Drawing Sheets

RECHARGEABLE BATTERY HAVING FIXING TERMINAL AND BATTERY MODULE USING THE SAME

RELATED APPLICATIONS

This application claims priority to and the benefit of Korean Patent Application No. 10-2014-0110963 filed in the Korean Intellectual Property Office on Aug. 25, 2014, the entire contents of which are incorporated herein by reference.

BACKGROUND

1. Field

The present invention relates to a battery module having an improved structure of a lower terminal.

2. Description of the Related Technology

A rechargeable battery differs from a primary battery in that it can be repeatedly charged and discharged, while the latter is incapable of being recharged.

A low-capacity rechargeable battery is used in small portable electronic devices such as mobile phones, notebook computers, and camcorders, while a high-capacity rechargeable battery can be used as a power source for driving motors of a hybrid vehicle, an electric vehicle, and the like.

The rechargeable battery may be used in small electronic devices as a single cell battery or in motor-driving power sources, etc., as a battery module in which a plurality of cells are electrically connected.

Electrode terminals of unit cells are connected in series or parallel through a bus bar so as to form a rechargeable battery module.

While the bus bar is disposed above the electrode terminals, nuts and the like are coupled to the electrode terminals to support the bus bar and the electrode terminals.

However, when continuous vibrations are delivered to the electrode terminals, the nuts become loose and thus contact between the electrode terminals and the bus bar becomes defective.

Particularly, when the rechargeable battery is installed in machines such as a vehicle, a power tool, etc., the electrode terminals and the bus bar are highly likely to develop poor contact therebetween.

In addition, when the bus bar and the electrode terminals are bonded by welding, the bus bar and the electrode terminal can be stably fixed to each other, but there is a problem in replacing a defective rechargeable battery.

The above information disclosed in this Background section is only for enhancement of understanding of the background of the invention and therefore it may contain information that does not form the prior art that is already known in this country to a person of ordinary skill in the art.

SUMMARY OF CERTAIN INVENTIVE ASPECTS

An objective of the present invention is to provide a rechargeable battery and a battery module having terminals in which dissimilar metals are bonded.

A rechargeable battery according to one aspect of the present invention includes: an electrode assembly including a first electrode, a second electrode, and a separator; a case for accommodating the electrode assembly; a first lower terminal protruding out of the case and electrically coupled to the first electrode; and a first fixing terminal installed to be movable with respect to the first lower terminal.

A fastening groove may be formed in the lower terminal, a rotation shaft may be formed in the first fixing terminal to be inserted into the fastening groove, a supporting protrusion may be formed to protrude at an external circumferential surface of the rotation shaft, and a supporting groove may be formed in the fastening groove to be inserted by the supporting protrusion.

A supporting protrusion may be formed to protrude at an inner side of the fastening groove, a supporting groove may be formed at an external circumferential surface of the rotation shaft to be fitted into the supporting protrusion, the first fixing terminal may have a plate shape, and a cutout may be formed in the first fixing terminal to be inserted by the first lower terminal.

A guide protrusion may be formed at an inner side of the cutout, a guide groove may be formed at an outer side of the first fixing terminal to be inserted by the guide protrusion, a guide protrusion may be formed to protrude at the outer side of the first fixing terminal, and a guide groove may be formed at an inner surface of the cutout to be inserted by the guide protrusion.

The first fixing terminal and the first lower terminal may be coupled by a connecting rod, the connecting rod may be integrally formed with the first fixing terminal and the first lower terminal and is twist-deformed, the first fixing terminal may have an anisotropic cross-section, and the first lower terminal may have a cylindrical shape.

The first fixing terminal may have a quadrangular plate shape, and the rechargeable battery may include a plate terminal fixed to the first lower terminal by welding and disposed to be separated from the first fixing terminal.

A battery module according to another aspect of the present invention includes: rechargeable batteries including a first lower terminal electrically coupled to an electrode assembly and a first fixing terminal installed to be movable with respect to the first lower terminal; and bus bars for electrically coupling the rechargeable batteries. A hole may be formed in each of the bus bars to be inserted by the first fixing terminal, and the first fixing terminal may contact a top surface of the bus bar to support the bus bar.

A fastening groove may be formed in the lower terminal, a rotation shaft may be formed in the first fixing terminal to be inserted into the fastening groove, a supporting protrusion may be formed to protrude at an external circumferential surface of the rotation shaft, and a supporting groove may be formed in the fastening groove to be inserted by the supporting protrusion.

A supporting protrusion may be formed to protrude at an inner side of the fastening groove, a supporting groove may be formed at an external circumferential surface of the rotation shaft to be fitted into the supporting protrusion, the first fixing terminal may have a plate shape, and a cutout may be formed in the first fixing terminal to be inserted by the first lower terminal.

A guide protrusion may be formed to protrude at an inner side of the cutout, a guide groove may be formed at an outer surface of the first fixing terminal to be inserted by the guide protrusion, a guide protrusion may be formed to protrude at an outer side of the first fixing terminal, and a guide groove may be formed at an inner side of the cutout to be inserted by the guide protrusion.

The first fixing terminal and the first lower terminal may be combined by a connecting rod, the connecting rod may be integrally formed with the first fixing terminal and the first lower terminal and is twist-deformed, the first fixing terminal may have an anisotropic cross-section, and the first lower terminal may have a cylindrical shape.

The first fixing terminal may have a quadrangular plate shape, and the battery module may include a plate terminal fixed to the first lower terminal by welding and disposed to be separated from the first fixing terminal.

Supporting jaws may be formed in the bus bar to contact lateral sides of the first fixing terminal and to control rotation thereof, a pressing protrusion may be formed to protrude toward the bus bar at a bottom surface of the fixing terminal that contacts the bus bar, and a recess portion may be formed in the bus bar to be inserted by the pressing protrusion.

A pressing protrusion may be formed to protrude toward the bus bar at a bottom surface of the fixing terminal contacting the bus bar, two supporting jaws may be formed in the bus bar to be separated from each other, the pressing protrusion may be inserted between the supporting jaws, a confining member may be formed in the bus bar, the confining member may have blocking jaws that are disposed to be separated from each other, and a mounting groove may be formed between the blocking jaws.

A bottom of the mounting groove may be formed such that it is higher than a top surface of the bus bar, supporting jaws having an arc-shaped cross-section may be formed in the bus bar, and the fixing terminal may be formed with a convex portion that is inserted into an inner space between the supporting jaws and has an arc-shaped cross-section.

In the battery module according to the exemplary embodiment of the present invention, the fixing terminal is installed to be movable with respect to the lower terminal and the fixing terminal supports and fixes the bus bar, thereby preventing contact between the bus bar and the terminals from becoming poor.

DETAILED DESCRIPTION OF CERTAIN INVENTIVE EMBODIMENTS

Figure 1:
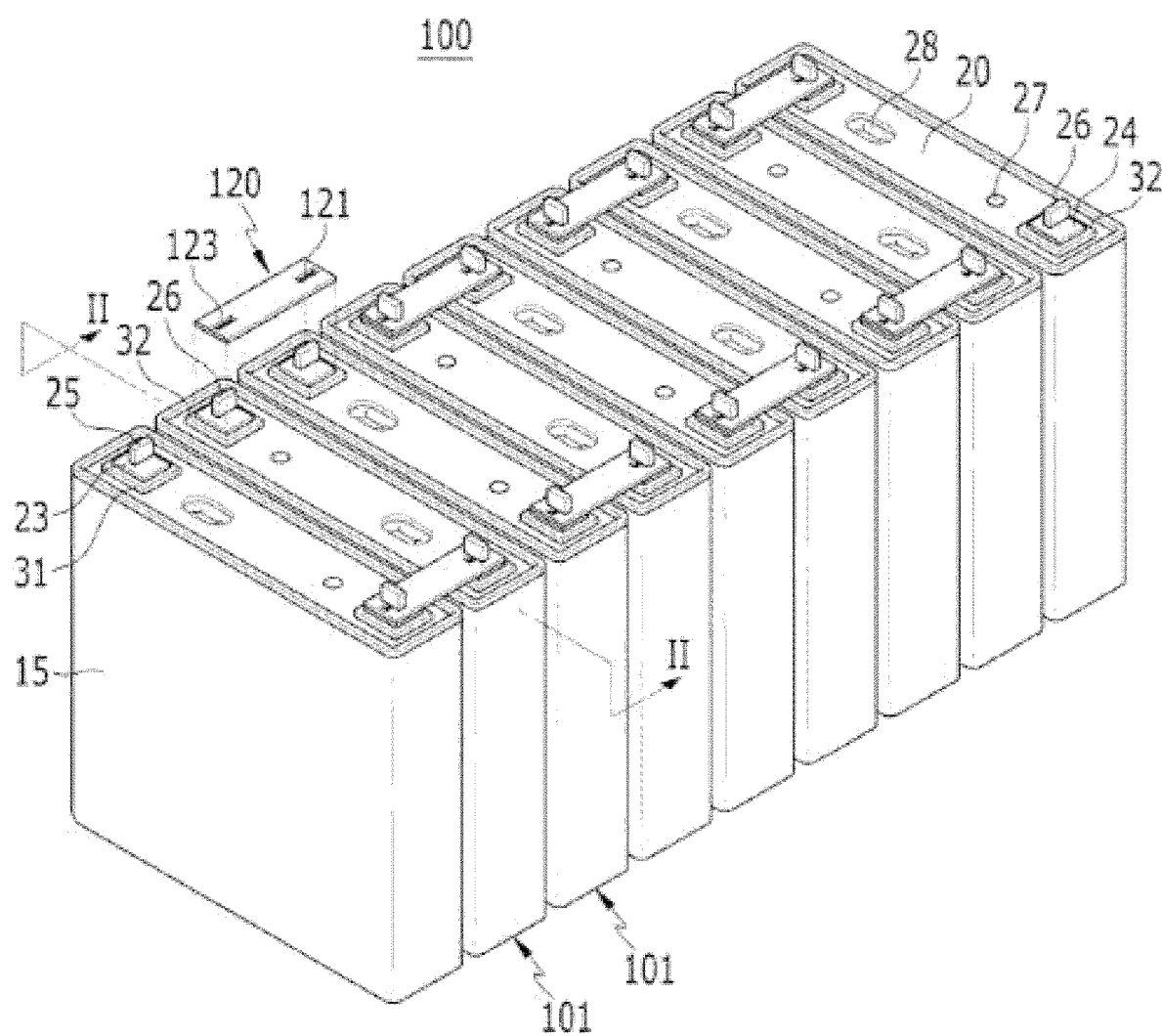
FIG. 1 is a perspective view of a battery module according to a first exemplary embodiment of the present invention.

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

Figure 2:
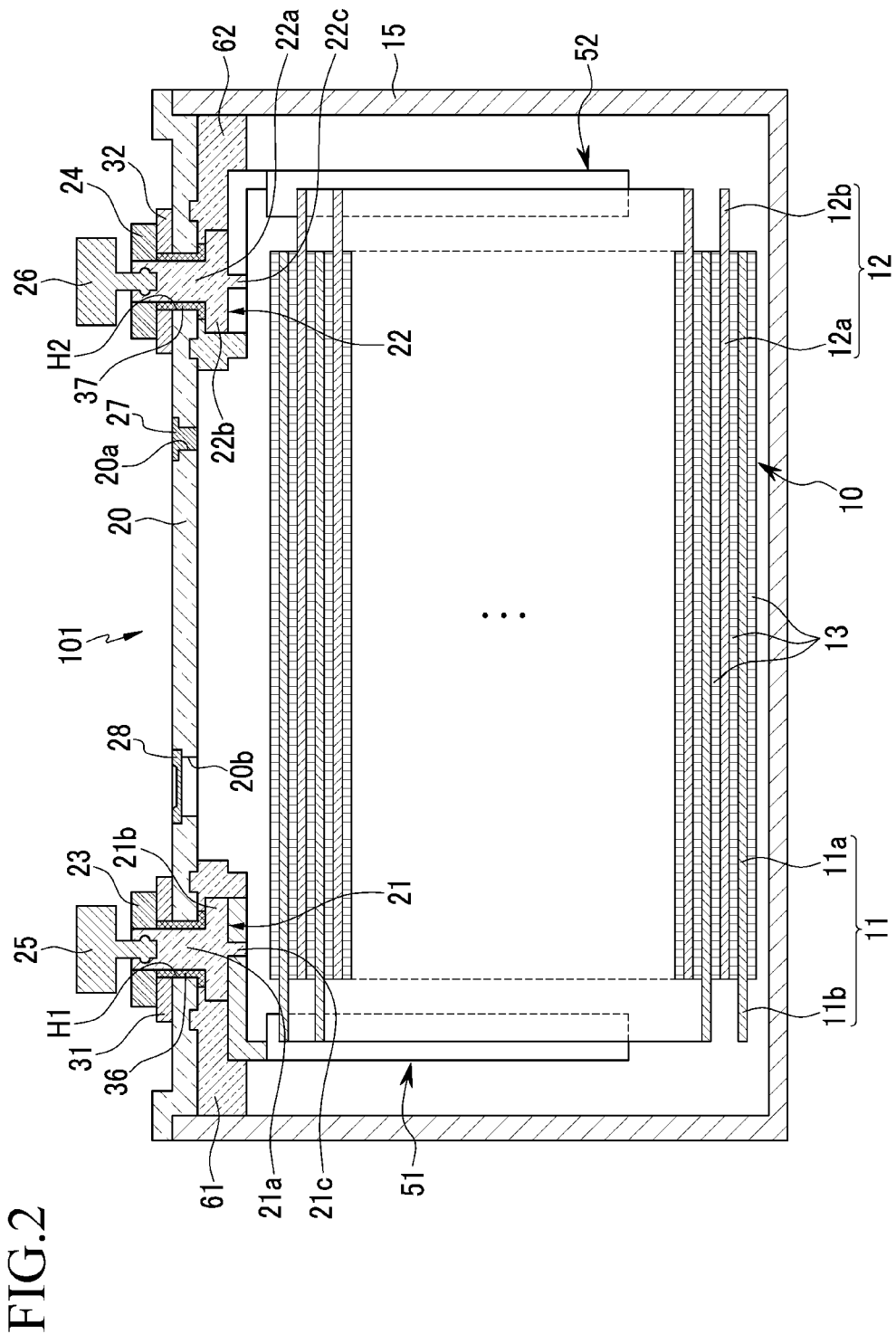
FIG. 2 is a cross-sectional view of a rechargeable battery of FIG. 1 taken along the line II-II.

FIG. 1 is a perspective view of a battery module according to a first exemplary embodiment of the present invention, and FIG. 2 is a cross-sectional view of a rechargeable battery of FIG. 1 taken along the line II-II.

Referring to FIG. 1, the battery module 100 of the current first exemplary embodiment includes a plurality of rechargeable batteries 101, and bus bars 120 for electrically coupling the rechargeable batteries 101.

The rechargeable battery 101 according to the present exemplary embodiment is exemplarily illustrated as a prism-shaped lithium ion rechargeable battery.

However, the present invention is not limited thereto, and it may be applied to various types of batteries such as a lithium polymer battery, a cylindrical battery, etc.

The rechargeable battery 101 includes: an electrode assembly 10 to be used for charging and discharging; a case 15 in which the electrode assembly 10 is stored; a cap plate 20 combined to an opening of the case 15; and first and second lower terminals 21 and 22 installed in the cap plate 20.

For example, the electrode assembly 10 is formed by disposing a first electrode (hereinafter referred to as a "positive electrode") 11 and a second electrode (hereinafter referred to as a "negative electrode") 12 at respective sides of a separator 13, which operates as an insulator, and then spirally-winding the positive electrode 11, the separator 13, and the negative electrode 12 in a jelly-roll shape. The positive and negative electrodes 11 and 12 respectively include coated regions 11a and 12a where an active material is coated on a current collector, and uncoated regions 11b and 12b having exposed portions of the current collector on which the active material is not coated.

The positive electrode uncoated region 11b is formed at a lateral end of the positive electrode 11 along the spirally wound positive electrode 11.

The negative electrode uncoated region 12b is formed at a lateral end of the negative electrode 12 along the spirally wound negative electrode 12.

The positive and negative uncoated regions 11b and 12b are disposed at opposite ends of the electrode assembly 10.

As an example, the case 15 is roughly formed in a cuboid shape to accommodate the electrode assembly 10 and an electrolyte solution, and an opening is formed at one side of the cuboid to connect inner and outer spaces thereof.

The opening is formed to allow the electrode assembly 10 to be inserted into the case 15.

The cap plate 20 is installed in the case 15 to close and seal the case 15.

For example, the case 15 and the cap plate 20 may be formed of aluminum such that they are welded to each other.

In addition, an electrolyte injection opening 20a, a vent hole 20b, and terminal holes H1 and H2 are formed in the cap plate 20.

After combining the cap plate 20 to the case 15, the electrolyte injection opening 20a allows the electrolyte solution to be injected into the case 15.

After injecting the electrolyte solution, the electrolyte injection opening 20a is sealed by a sealing cap 27.

The vent hole 20b is sealed by a vent plate 28 such that it releases internal pressure of the rechargeable battery 101.

When the internal pressure of the rechargeable battery 101 reaches a predetermined pressure, the vent plate 28 is ruptured to open the vent hole 20b.

A notch is formed in the vent plate 28 to induce the rupture.

Figure 3:
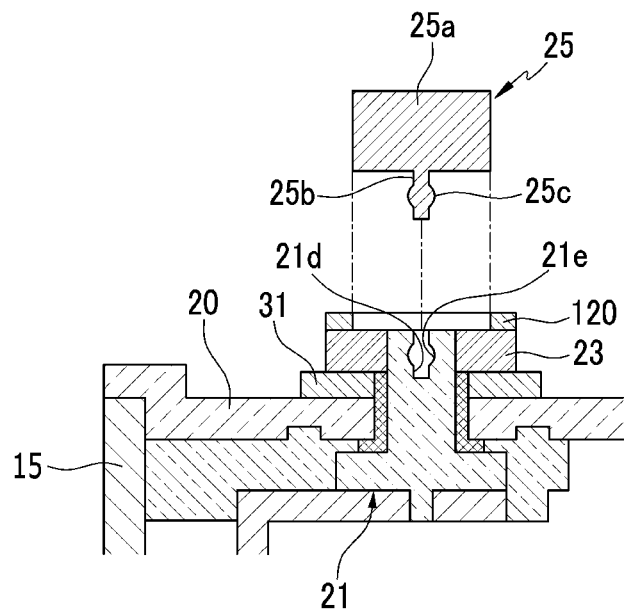
FIG. 3 is a partial cross-sectional view of the rechargeable battery according to the first exemplary embodiment of the present invention.
Figure 4:
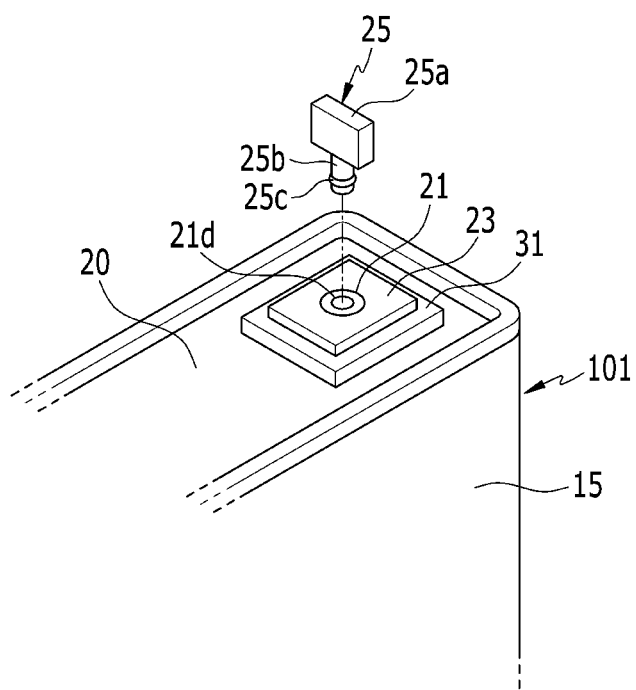
FIG. 4 is a partial exploded perspective view of the rechargeable battery according to the first exemplary embodiment of the present invention.

FIG. 3 is a partial cross-sectional view of the rechargeable battery according to the first exemplary embodiment of the present invention, and FIG. 4 is a partial exploded perspective view of the rechargeable battery according to the first exemplary embodiment of the present invention.

Referring to FIGS. 2 to 4, the first lower terminal 21 and the second lower terminal 22 have a pillar shape, and are installed to penetrate the cap plate 20.

The first lower terminal 21 is inserted into the terminal hole H1, and the second lower terminal 22 is inserted into the terminal hole H2.

The first lower terminal 21 is electrically coupled to the positive electrode 11 of the electrode assembly 10, while the second lower terminal 22 is electrically coupled to the negative electrode 12 of the electrode assembly 10.

Accordingly, a charged current in the electrode assembly 10 is drawn out of the case 15 through the first and second lower terminals 21 and 22.

A first plate terminal 23 is provided above the first lower terminal 21, and the first lower terminal 21 is bonded to the first plate terminal 23 by welding while being inserted into the first plate terminal 23.

A hole is formed in the first plate terminal 23, and the first lower terminal 21 is inserted into the hole.

An upper insulating member 31 is formed between the first plate terminal 23 and the cap plate 20 to insulate the first plate terminal 23 from the cap plate 20.

A positive electrode gasket 36 is installed between the cap plate 20 and the first lower terminal 21.

The positive electrode gasket 36 is inserted into the terminal hole H1 to seal and electrically insulate between the first lower terminal 21 and the cap plate 20.

A positive electrode lead tab 51 is provided to be combined to the positive electrode 11.

The positive electrode lead tab 51 electrically couples the positive electrode 11 and the first lower terminal 21, and is bonded to both the positive electrode uncoated region 11b and the first lower terminal 21 by welding.

A lower insulating member 61 is provided between the positive lead tab 51 and the cap plate 20 such that it electrically insulates the positive lead tab 51 from the cap plate 20.

In addition, one side of the lower insulating member 61 is combined to the cap plate 20 and the other side thereof encloses the positive lead tab 51 and the second lower terminal 21, thereby stabilizing a connecting structure therebetween.

The first lower terminal 21 includes a pillar portion 21a, a flange portion 21b protruding from an external circumferential surface of the pillar portion 21a, and a supporting protrusion 21c downwardly protruding from a bottom surface of the column portion 21a.

The pillar portion 21a has a cylindrical shape, and the flange portion 21b has a substantially quadrangular plate shape.

The supporting protrusion 21c is fitted into the positive electrode lead tab 51 to be fixed to the positive electrode lead tab 51 by welding.

A second plate terminal 24 is installed above the second lower terminal 22, and is bonded to the second plate terminal 24 by welding while being fitted into the second plate terminal 24.

A hole is formed in the second plate terminal 24, and the second lower terminal 22 is inserted into the hole.

An upper insulating member 32 is installed between the second plate terminal 24 and the cap plate 20 to insulate the second plate terminal 24 from the cap plate 20.

A negative electrode gasket 37 is installed between the cap plate 20 and the second lower terminal 22.

The negative electrode gasket 37 is inserted into the terminal hole H2 to seal and electrically insulate between the second lower terminal 22 and the cap plate 20.

A negative electrode lead tab 52 is installed to be combined to the negative electrode 12.

The negative electrode lead tab 52 electrically couples the negative electrode 12 and the second lower terminal 22, and is bonded to both the negative uncoated region 12b and the second lower terminal 22 by welding.

A lower insulating member 62 is installed between the negative electrode lead tab 52 and the cap plate 20 to electrically insulate the negative electrode lead tab 52 from the cap plate 20.

In addition, one side of the lower insulating member 62 is combined to the cap plate 20 and the other side thereof encloses the negative electrode lead tab 52 and the second lower terminal 22, thereby stabilizing a connecting structure therebetween.

The second lower terminal 22 includes a pillar portion 22a, a flange portion 22b protruding from an external circumference of the pillar portion 22a, and a supporting protrusion 22c downwardly protruding from a bottom surface of the pillar portion 22a.

The pillar portion 22a has a cylindrical shape, and the flange portion 22b has a substantially quadrangular plate shape.

The supporting protrusion 22c is fitted into the negative electrode lead tab 52 to be fixed to the negative electrode lead tab 52 by welding.

A first fixing terminal 25 is installed to be combined to the first lower terminal 21, and the first fixing terminal 25 is installed to be movable with respect to the first lower terminal 21.

In addition, a second fixing terminal 26 is installed in the second lower terminal 22, and the second fixing terminal 26 is installed to be movable with respect to the second lower terminal 22.

Since the first fixing terminal 25 has the same structure as the first fixing terminal 26, a description of the first fixing terminal 25 will also apply to the second fixing terminal 26.

The first fixing terminal 25 includes a pressing supporter 25a disposed to be separated from the first plate terminal 23, and a rotation shaft 25b protruding toward the first lower terminal 21 from a lower end of the pressing supporter 25a.

The pressing supporter 25a has a plate shape and has a substantially rectangular cross-section.

The rotation shaft 25b has a circular cylinder shape and is partially inserted into the first lower terminal 21.

A supporting protrusion 25c is formed to outwardly protrude from an external circumferential surface of the rotation shaft 25b, and the supporting protrusion 25c is formed to be elongated along the circumferential direction of the rotation shaft 25b.

A fastening groove 21d is formed in the first lower terminal 21 to be inserted by the rotation shaft 25b, and the fastening groove is formed to be elongated along a length direction of the first lower terminal.

A supporting groove 21e is formed at an inner circumferential surface of the fastening groove 21d such that it is inserted by the supporting protrusion 25c, and the supporting groove 21e is formed to be elongated along a circumferential direction of the fastening groove 21d.

As shown in FIG. 1, the bus bar 120 has a quadrangular plate shape, and is formed with a first connection hole 121 into which the first fixing terminal 25 installed in one rechargeable battery 101 is inserted and a second connection hole 123 into which the second fixing terminal 26 installed in the adjacent rechargeable battery 101 is inserted.

The bus bar 120 is disposed between the first plate terminal 23 and the pressing supporter 25a, and the bus bar 120 is installed to contact the first plate terminal 23 since the pressing supporter 25a penetrates the first connection hole 121.

In this state, when the first fixing terminal 25 is moved with respect to the first lower terminal 21, the first fixing terminal 25 can support the bus bar 120 above the bus bar 120.

Particularly, when an interval between the pressing supporter 25a and the first plate terminal 23 is smaller than a thickness of the bus bar 120, the bus bar 120 and the first plate terminal 23 may be tightly attached to each other.

In addition, the first fixing terminal 25 may stably press the bus bar 120 since the first lower terminal 21 supports the first fixing terminal 25 through the supporting protrusion 25c.

In the related art, when a nut is fastened to a terminal having a pillar shape, there is no structure for holding the nut below the terminal, thereby causing the nut to become loose due to vibrations.

Particularly, even if the nut is rotated a small amount, the nut is moved upward and thus is unable to sufficiently press the bus bar.

However, even if the first fixing terminal 25 according to the present exemplary embodiment is rotated, it is moved in a direction parallel to a top surface of the bus bar 120 such that pressure applied to the bus bar 120 is not decreased.

Figure 5:
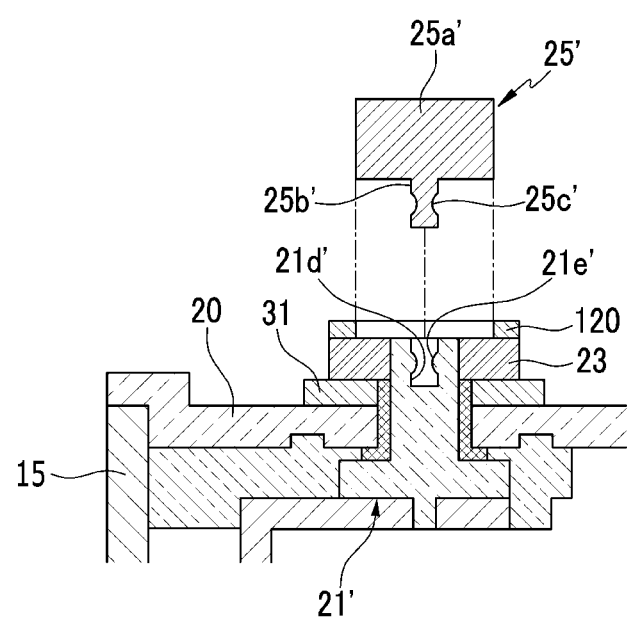
FIG. 5 is a partial cross-sectional view of a rechargeable battery according to an exemplary variation of the first exemplary embodiment of the present invention.

FIG. 5 is a partial cross-sectional view of a rechargeable battery according to an exemplary variation of the first exemplary embodiment of the present invention.

Referring to FIG. 5, the rechargeable battery according to the exemplary variation of the current first exemplary embodiment has the same structure as the rechargeable battery according to the aforementioned first exemplary embodiment, except for a first fixing terminal 25' and a first lower terminal 21', so a repeated description of the same structure will be omitted.

In addition, the second fixing terminal and the second lower terminal have the same structures as the first fixing terminal 25' and the first lower terminal 21', so a repeated description of the same structure will be omitted.

The first fixing terminal 25' includes a pressing supporter 25a' that is disposed to be separated from the first plate terminal 23, and a rotation shaft 25b' that protrudes toward the first lower terminal 21' from a lower end of the pressing supporter 25a'.

The pressing supporter 25a' has a plate shape, which has a substantially rectangular cross-section.

The rotation shaft 25b' has a cylindrical shape and is partially inserted into the first lower terminal 21'.

A supporting groove 25c' is formed at an external circumferential surface of the rotation shaft 25b' such that it is inwardly recessed, and the supporting groove 25c' is formed to be elongated along a circumferential direction of the rotation shaft 25b'.

A fastening groove 21d' is formed in the first lower terminal 21' to be inserted by the rotation shaft 25b', and the fastening groove 21d' is formed to be elongated in a length direction of the first lower terminal 21'.

A supporting protrusion 21e' is formed at an inner circumferential surface of the fastening groove 21d' to be inserted into the supporting groove 25c', and the supporting protrusion 21e' is formed to be elongated in a circumferential direction of the fastening groove 21d'.

Figure 6:
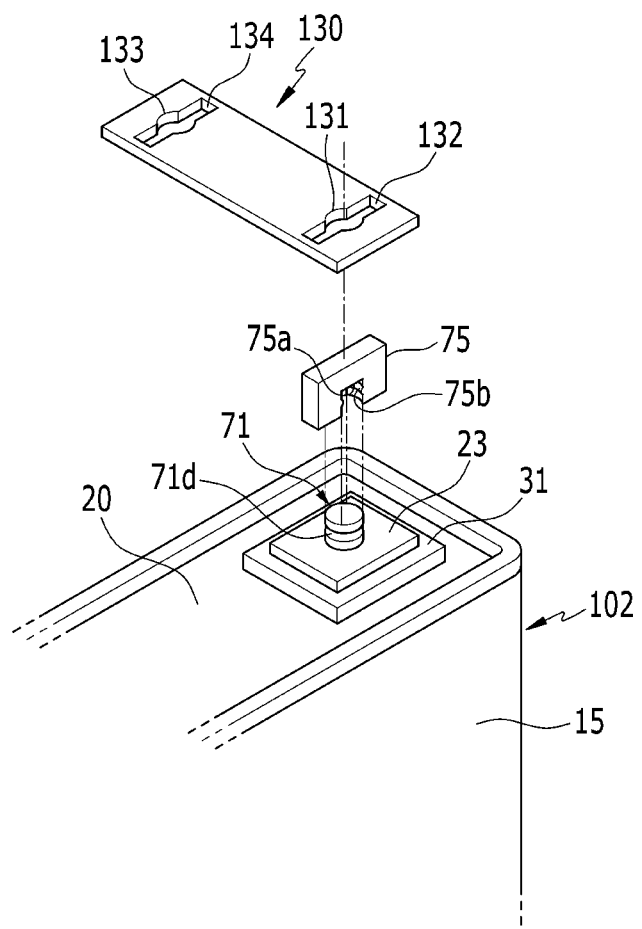
FIG. 6 is an exploded perspective view of a rechargeable battery and a bus bar according to a second exemplary embodiment of the present invention.
Figure 7:
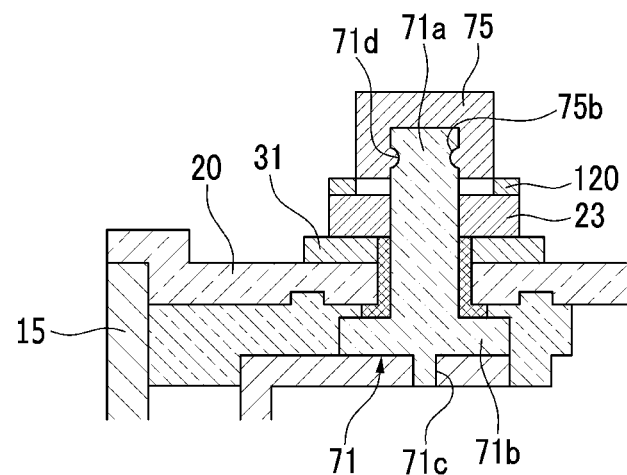
FIG. 7 is a cross-sectional view of the rechargeable battery and the bus bar according to the second exemplary embodiment of the present invention combined together.

FIG. 6 is an exploded perspective view of a rechargeable battery and a bus bar according to a second exemplary embodiment of the present invention, and FIG. 7 is a cross-sectional view of the rechargeable battery and the bus according to the second exemplary embodiment of the present invention combined together.

Referring to FIGS. 6 and 7, the rechargeable battery and the battery module according to the current second exemplary embodiment have the same structures as the rechargeable battery and the battery module according to the aforementioned first exemplary embodiment, except for a lower terminal, a fixing terminal, and a bus bar, so a repeated description of the same structure will be omitted.

In addition, since the second lower terminal and the second fixing terminal that are coupled to the negative electrode have the same structures as the first lower terminal and the first fixing terminal that are coupled to the positive electrode, descriptions of the first lower terminal and the first fixing terminal will also apply to the second lower terminal and the second fixing terminal.

A first lower terminal 71 has a pillar shape, and is installed to penetrate the cap plate 20.

The first lower terminal 71 includes a pillar portion 71a, a flange portion 71b outwardly protruding from a lower end of the pillar portion 71a, and a supporting protrusion 71c downwardly protruding from a bottom surface of the pillar portion 71a.

The pillar portion 71a has a cylindrical shape, and the flange portion 71b has a substantially quadrangular plate shape.

The supporting protrusion 71c is fitted into the positive electrode lead tab to be fixed to the positive electrode lead tab by welding.

In addition, a guide groove 71d is formed in the pillar portion 71a to be inserted by a guide protrusion 75b that is formed in a first fixing terminal 75.

The guide groove 71d is formed to be elongated in a circumferential direction of the pillar portion 71a.

The first fixing terminal 75 is installed to be combined to the first lower terminal 71, and the first fixing terminal 75 is installed to be movable with respect to the first lower terminal 71.

The first fixing terminal 75 has a plate shape, and a cutout 75a is formed at a lower part of the first fixing terminal 75 such that it is inserted by the pillar portion 71a.

The cutout 75a is elongated to an upper part of the first fixing terminal 75 from a lower central end of the first fixing terminal 75.

The guide protrusion 75b is formed to protrude at an inner side of the cutout 75a, and the guide protrusion 75b is fitted into the aforementioned guide groove 71d.

A bus bar 130 has a quadrangular plate shape, and is formed with a first connection hole 132 into which a first fixing terminal 75 installed in one rechargeable battery 102 is inserted and a second connection hole 134 into which a second fixing terminal installed in an adjacent rechargeable battery 102 is inserted.

In addition, expansion grooves 131 and 133 are formed in the connection holes 132 and 134 to be inserted by the lower terminals.

The expansion grooves 131 and 133 are formed to outwardly expand from inner sides of the connection holes 132 and 134.

The bus bar 130 is disposed to be tightly attached to the first plate terminal 23, and in this case, the first fixing terminal 75 penetrates the connection hole, and the first lower terminal 71 is inserted into the expansion grooves 131 and 133.

Accordingly, the bus bar 130 is disposed between the first fixing terminal 75 and the first plate terminal 23.

In this case, when the first fixing terminal 75 is moved with respect to the first lower terminal 71, the first fixing terminal 75 may support the bus bar 130 thereabove.

Figure 8:
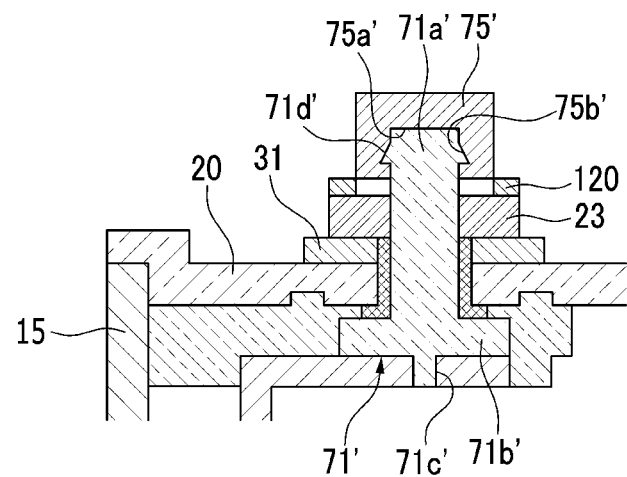
FIG. 8 is a cross-sectional view of a rechargeable battery and a bus bar according to an exemplary variation of the second exemplary embodiment of the present invention combined together.

FIG. 8 is a cross-sectional view of a rechargeable battery and a bus bar according to an exemplary variation of the second exemplary embodiment of the present invention combined together.

Referring to FIG. 8, since the rechargeable battery according to the exemplary variation of the current second exemplary embodiment has the same structure as the rechargeable battery according to the aforementioned second exemplary embodiment, except for a first fixing terminal 75' and a first lower terminal 71', a repeated description of the same structure will be omitted.

In addition, since the second fixing terminal and the second lower terminal have the same structures as the first fixing terminal 75' and the second lower terminal 71', a repeated description of the same structure will be omitted.

The first lower terminal 71' has a pillar shape and is installed to penetrate the cap plate 20.

The first lower terminal 71' includes a pillar portion 71a', a flange portion 71b' outwardly protruding from a lower end of the pillar portion 71a', and a supporting protrusion 71c' downwardly protruding from a bottom surface of the pillar portion 71a'.

The pillar portion 71a' has a cylindrical shape, and the flange portion 71b' has a substantially quadrangular shape.

The supporting protrusion 71c' is fitted into the positive electrode lead tab to be fixed to the positive electrode lead tab by welding.

In addition, a guide protrusion 71d' is formed to outwardly protrude from the pillar portion 71a', and the guide protrusion 71d' is formed to be elongated in a circumferential direction of the pillar portion 71a' so as to define a triangular cross-section.

A guide groove 75b' is formed in the first fixing terminal 75' such that it is inserted by the guide protrusion 71d'.

The first fixing terminal 75' is installed to be movable with respect to the first lower terminal 71'.

The first fixing terminal 75' has a plate shape, and a cutout 75a' is formed at a lower part of the first fixing terminal 75' such that it is inserted by the pillar portion 71a'.

The cutout 75a' is elongated to an upper part of the first fixing terminal 75' from a lower central end of the first fixing terminal 75'.

The guide groove 75b' is formed to protrude at an inner side of the cutout 75a', and the aforementioned guide protrusion 71d' is fitted into the guide groove 75b'.

Figure 9:
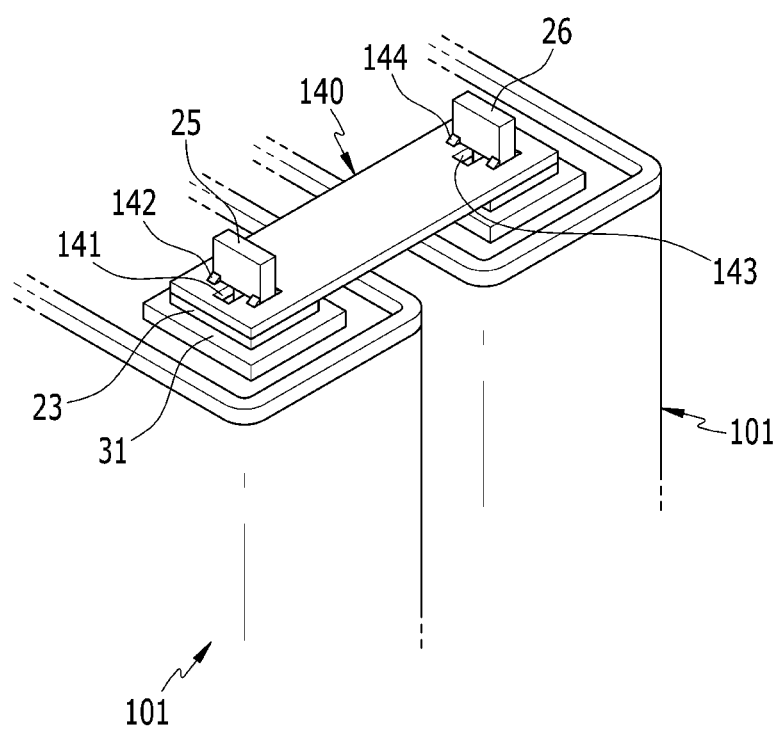
FIG. 9 is a partial perspective view of a battery module according to a third exemplary embodiment of the present invention.
Figure 10:
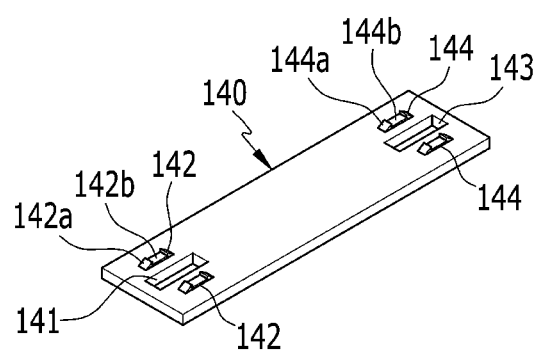
FIG. 10 is a perspective view of a bus bar according to the third exemplary embodiment of the present invention.

FIG. 9 is a partial perspective view of a battery module according to a third exemplary embodiment of the present invention, and FIG. 10 is a perspective view of a bus bar according to the third exemplary embodiment of the present invention.

Referring to FIGS. 9 and 10, since the battery module according to the current third exemplary embodiment has the same structure as the rechargeable battery according to the aforementioned first exemplary embodiment, except for a bus bar, a repeated description of the same structure will be omitted.

A bus bar 140 has a quadrangular plate shape, and is formed with a first connection hole 141 into which the first fixing terminal 25 installed in one rechargeable battery 101 is inserted, and a second connection hole 143 into which the second fixing terminal 26 installed in the adjacent rechargeable battery 101 is inserted.

In addition, in the bus bar 140, a first confining member 142 is formed to support the first fixing terminal 25, and a second confining member 144 is formed to support the second fixing terminal 26.

The first confining member 142 is disposed adjacent to the connection hole 141, and the second confining member 144 is disposed adjacent to the connection hole 143.

The first confining member 142 includes two blocking jaws 142a that protrude from the bus bar 140 and are slantedly formed with respect to a top surface of the bus bar 140, and a mounting groove 142b that is formed between the blocking jaws 142a.

A bottom of the mounting groove 142b is formed such that it is higher than the top surface of the bus bar 140, and two first confining members 142 are disposed to be separated from each other while interposing the first connection hole 141 therebetween.

The second confining member 144 includes two blocking jaws 144a that protrude from the bus bar 140 and are slantedly formed with respect to the top surface of the bus bar 140, and a mounting groove 144b that is formed between the blocking jaws 144a.

A bottom of the mounting groove 144b is formed such that it is higher than the top surface of the bus bar 140, and two second confining members 144 are disposed to be separated from each other while interposing the connection hole 143 therebetween.

After the bus bar 140 is disposed to contact the first plate terminal 73, the first fixing terminal 25 disposed above the connection hole 141 is rotated to fix the bus bar 140.

In this case, the first fixing terminal 25 is rotated to be inserted into the mounting groove 142b, and rotational movement is confined by the blocking jaws 142a.

Accordingly, the first and second fixing terminals 25 and 26 can be prevented or inhibited from being rotated due to external vibrations or impacts.

In addition, since the bottoms of the mounting grooves 142b and 144b are formed such that they are higher than the top surface of the bus bar 140, the first and second fixing terminals 25 and 26 can reliably press the bus bar 140 toward the plate terminal.

Thus, contact resistance between the bus bar 140 and the plate terminal can be preventing or inhibited from being increased.

Figure 11:
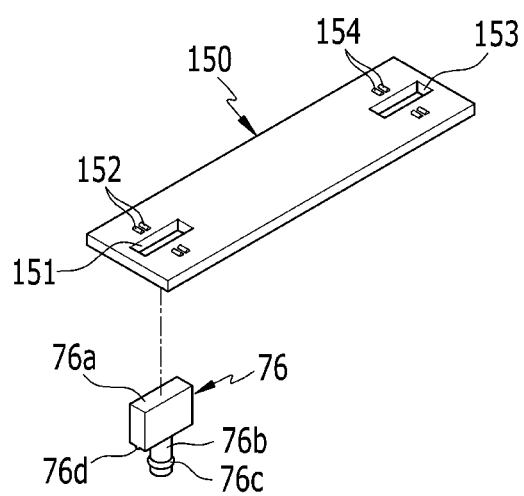
FIG. 11 is an exploded perspective view of a bus bar and a fixing terminal according to a fourth exemplary embodiment of the present invention.
Figure 12:
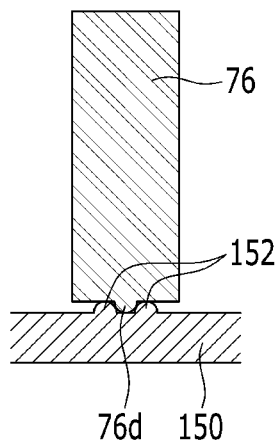
FIG. 12 is a cross-sectional view of the fixing terminal and the bus bar according to the fourth exemplary embodiment of the present invention combined together.

FIG. 11 is an exploded perspective view of a bus bar and a fixing terminal according to a fourth exemplary embodiment of the present invention, and FIG. 12 is a cross-sectional view of the fixing terminal and the bus bar according to the fourth exemplary embodiment of the present invention combined together.

Referring to FIGS. 11 and 12, since the rechargeable battery and the battery module according to the current fourth exemplary embodiment have the same structures as the rechargeable battery and the battery module according to the aforementioned first exemplary embodiment, except for a fixing terminal and a bus bar, a repeated description of the same structure will be omitted.

In addition, since the second fixing terminal coupled to the negative electrode has the same structure as the first fixing terminal coupled to the positive electrode, a description of the first fixing terminal will also apply to that of the second fixing terminal.

A first fixing terminal 76 includes a pressing supporter 76a having a plate shape, and a rotation shaft 76b protruding from a lower end of the pressing supporter 76a.

Substantially, the pressing supporter 76a has a rectangular cross-section and a rectangular vertical cross-section.

The rotation shaft 76b has a cylindrical shape and is partially inserted into the first lower terminal.

A supporting protrusion 76c is formed to outwardly protrude from an external circumferential surface of the rotation shaft 76b, and the supporting protrusion 76c is formed to be elongated along a circumferential direction of the rotation shaft 76b.

In addition, a pressing protrusion 76d is formed at a bottom surface of the pressing supporter 76a to protrude toward the bus bar 150.

A bus bar 150 has a quadrangular plate shape, and is formed with a first connection hole 151 into which the first fixing terminal installed in one rechargeable battery is inserted, and a first connection hole 153 into which the second fixing terminal installed in the adjacent rechargeable battery is inserted.

In addition, in the bus bar 150, first supporting jaws 152 are formed to support the first fixing terminal 76 and second supporting jaws 154 are formed to support the second fixing terminal.

The two first supporting jaws 152 are disposed to be separated from each other, and a pressing protrusion 76d is inserted between the first supporting jaws 152.

Since the pressing protrusion 76d is inserted into the supporting jaws 152 and 154, it can not only control rotation of the fixing terminal but also press the bus bar and the plate terminal to be closely attached to each other.

Figure 13:
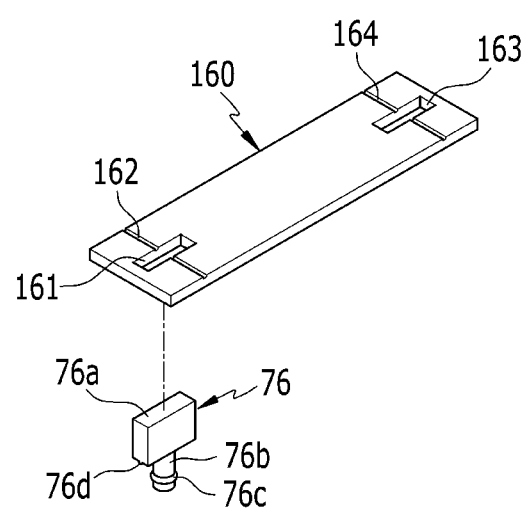
FIG. 13 is an exploded perspective view of a fixing terminal and a bus bar according to a fifth exemplary embodiment of the present invention.
Figure 14:
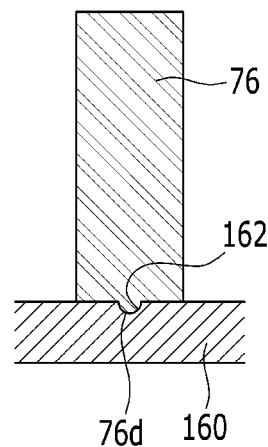
FIG. 14 is a cross-sectional view of the fixing terminal and the bus bar according to the fifth exemplary embodiment of the present invention combined together.

FIG. 13 is an exploded perspective view of a fixing terminal and a bus bar according to a fifth exemplary embodiment of the present invention, and FIG. 14 is a cross-sectional view of the fixing terminal and the bus bar according to the fifth exemplary embodiment of the present invention combined together.

Referring to FIGS. 13 and 14, since the rechargeable battery and the battery module according to the current fifth exemplary embodiment have the same structures as the rechargeable battery and the battery module according to the aforementioned first exemplary embodiment, except for a fixing terminal and a bus bar, a repeated description of the same structure will be omitted.

In addition, since the second fixing terminal coupled to the negative electrode has the same structure as the first fixing terminal coupled to the positive electrode, a description of the first fixing terminal will apply to the second fixing terminal.

A first fixing terminal 76 includes a pressing supporter 76a having a plate shape, and a rotation shaft 76b protruding from a lower end of the pressing supporter 76a.

Substantially, the pressing supporter 76a has a rectangular cross-section and a rectangular vertical cross-section.

The rotation shaft 76b has a cylindrical shape and is partially inserted into the first lower terminal.

A supporting protrusion 76c is formed to outwardly protrude from an external circumferential surface of the rotation shaft 76b, and the supporting protrusion 76c is formed to be elongated along a circumferential direction of the rotation shaft 76b.

In addition, a pressing protrusion 76d is formed at a bottom surface of the pressing supporter 76a to protrude toward the bus bar 160.

The bus bar 160 has a quadrangular plate shape, and is formed with a first connection hole 161 into which the first fixing terminal 76 installed in one rechargeable battery is inserted and a second connection hole 163 into which the second fixing terminal installed in the adjacent rechargeable battery is inserted.

A first recess portion 162 is formed in the bus bar 160 such that it is elongated in a width direction of the bus bar 160, and the first recess portion 162 is coupled to the first connection hole 161.

The pressing protrusion 76d is fitted into the first recess portion 162 such that it supports the pressing protrusion 76d.

In addition, a second recess portion 164 is formed in the bus bar 160 to be elongated in the width direction of the bus bar 160, and the second recess portion 164 is coupled to the second connection hole 163.

The second recess portion 164 is inserted by the pressing protrusion to support the pressing protrusion.

Figure 15:
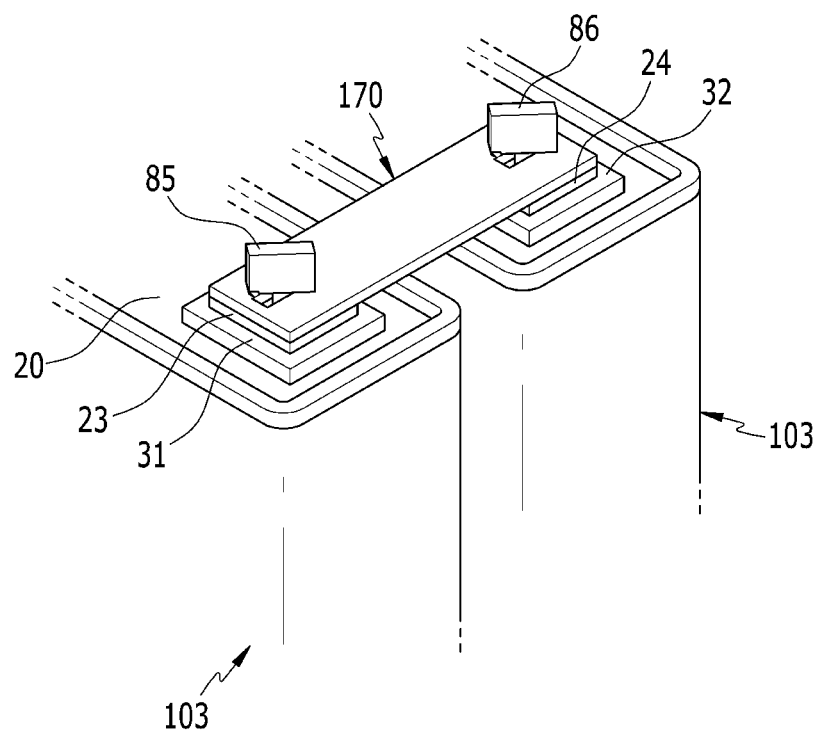
FIG. 15 is a partial perspective view of a battery module according to a sixth exemplary embodiment of the present invention.
Figure 16:
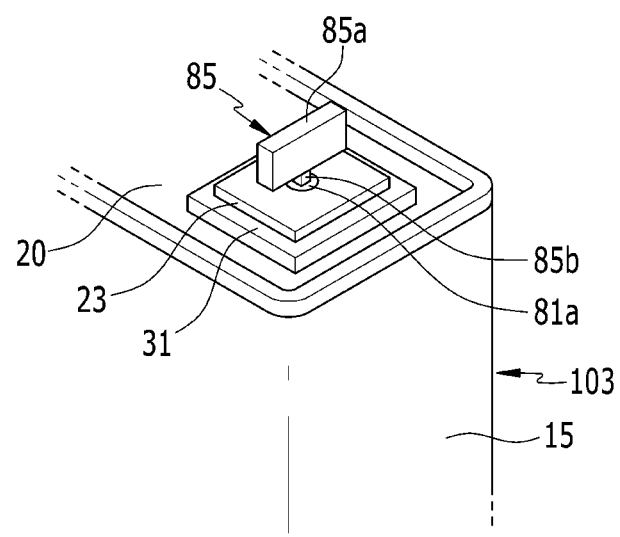
FIG. 16 is a partial perspective view of a rechargeable battery according to the sixth exemplary embodiment of the present invention.

FIG. 15 is a partial perspective view of a battery module according to a sixth exemplary embodiment of the present invention, and FIG. 16 is a partial perspective view of a rechargeable battery according to the sixth exemplary embodiment of the present invention.

Figure 17:
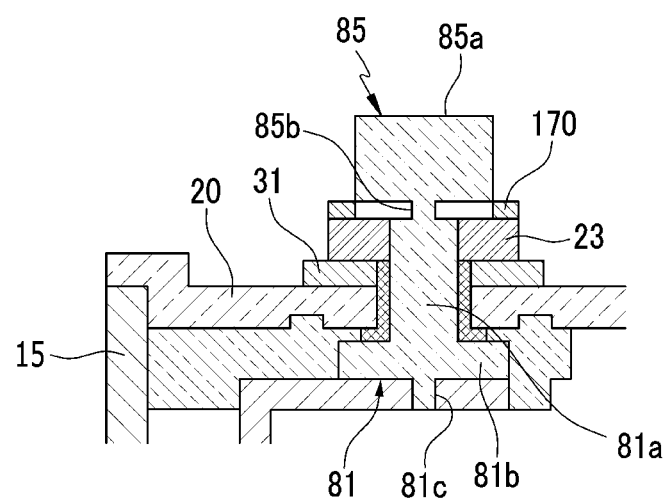
FIG. 17 is a cross-sectional view of a bus bar and the rechargeable battery according to the sixth exemplary embodiment of the present invention combined together.
Figure 18:
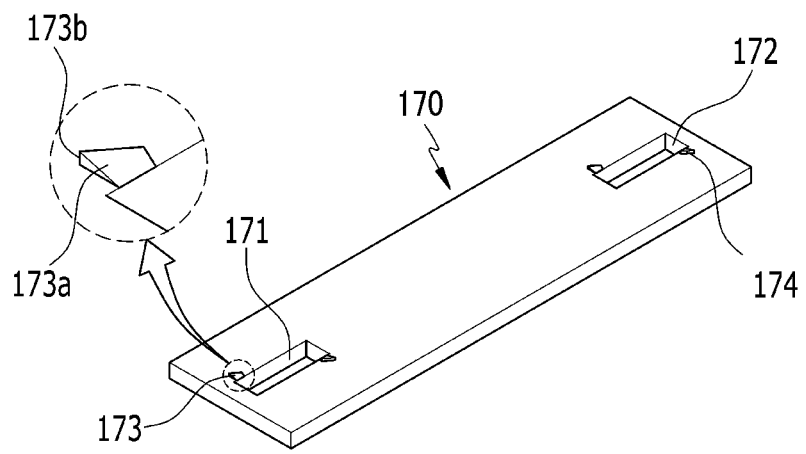
FIG. 18 is a perspective view of the bus bar according to the sixth exemplary embodiment of the present invention.

In addition, FIG. 17 is a cross-sectional view of a bus bar and the rechargeable battery according to the sixth exemplary embodiment of the present invention combined together, and FIG. 18 is a perspective view of the bus bar according to the sixth exemplary embodiment of the present invention.

Referring to FIGS. 15 to 18, since the rechargeable battery 103 and the battery module according to the present exemplary embodiment have the same structures as the rechargeable battery and the battery module according to the aforementioned first exemplary embodiment, except for a lower terminal, a fixing terminal, and a bus bar, a repeated description of the same structure will be omitted.

In addition, since the second lower terminal and the second fixing terminal that are coupled to the negative electrode have the same structures as the first lower terminal and the first fixing terminal that are coupled to the negative electrode, descriptions of the first lower terminal and the first fixing terminal will also apply to the second lower terminal and the second fixing terminal.

A first lower terminal 81 has a pillar shape, and is installed to penetrate the cap plate 20.

The first lower terminal 81 includes a pillar portion 81a, a flange portion 81b outwardly protruding from a lower end of the pillar portion 81a, and a supporting protrusion 81c downwardly protruding from a bottom surface of the pillar portion 81a.

The pillar portion 81a has a cylindrical shape, and the flange portion 81b has a substantially quadrangular plate shape.

The supporting protrusion 81c is fitted into the positive electrode lead tab to be fixed to the positive electrode lead tab by welding.

A first fixing terminal 85 is integrally formed with the first lower terminal 81, and the first fixing terminal 85 includes a pressing supporter 85a disposed to be separated from the plate terminal 23 and a connecting rod 85b protruding from a lower end of the pressing supporter 85a to be coupled to the pillar portion 81a.

The connecting rod 85b connects the pressing supporter 85a and the pillar portion 81a, and is integrally formed with the pressing supporter 85a and the pillar portion 81a.

The connecting rod 85b has a smaller vertical cross-sectional area such that it can be sufficiently twisted.

A bus bar 170 has a quadrangular plate shape, and is formed with a first connection hole 171 into which the first fixing terminal 85 installed in one rechargeable battery 103 is inserted and a second connection hole 172 into which a second fixing terminal 86 installed in the adjacent rechargeable battery 103 is inserted.

First supporting jaws 173 are formed in the bus bar 170 to support the first fixing terminal 85, and two first supporting jaws 173 are disposed to be rotationally symmetrical to each other based on a central axis of the first fixing terminal 85.

Each first supporting jaws 173 includes an inclined surface 173a that is slantedly formed with respect to a top surface of the bus bar 170, and a stepped surface 173b that connects an upper end of the inclined surface 173a and the bus bar 170.

The stepped surface 173b contacts an external circumferential surface of the first fixing terminal to limit rotation of the first fixing terminal.

In addition, second supporting jaws 174 are formed in the bus bar 170 to support the second fixing terminal 86, and two second supporting jaws 174 are disposed to be rotationally symmetrical to each other based on a central axis of the second fixing terminal 86.

As shown in FIG. 15, when the first fixing terminal 85 is rotated, distortion of the connecting rod 85b occurs and the first fixing terminal 85 is caught by the first supporting jaws 173.

In addition, when the second fixing terminal 86 is rotated, distortion of the connecting rod occurs and the second fixing terminal 86 is caught by the second supporting jaws 174.

Figure 19:
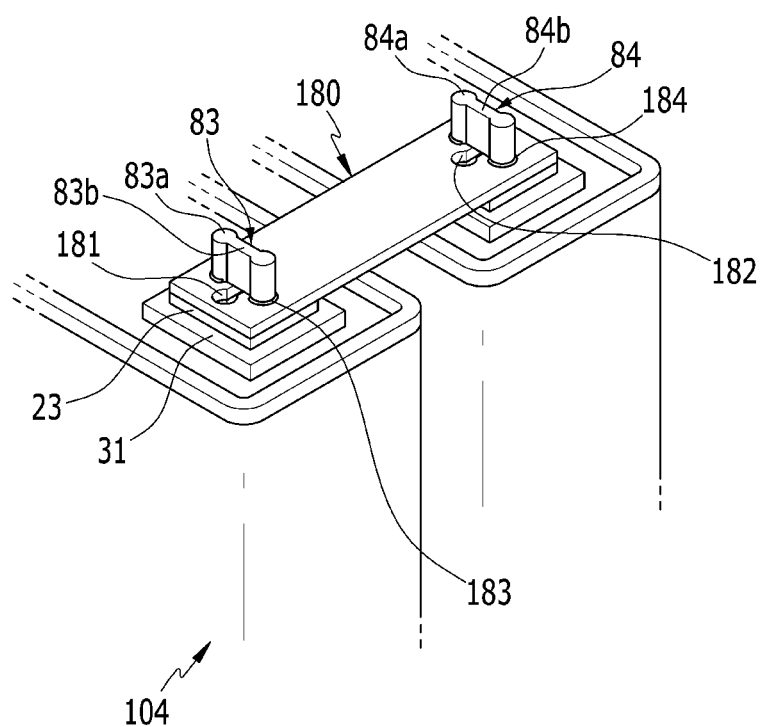
FIG. 19 is a partial perspective view of a battery module according to a seventh exemplary embodiment of the present invention.
Figure 20:
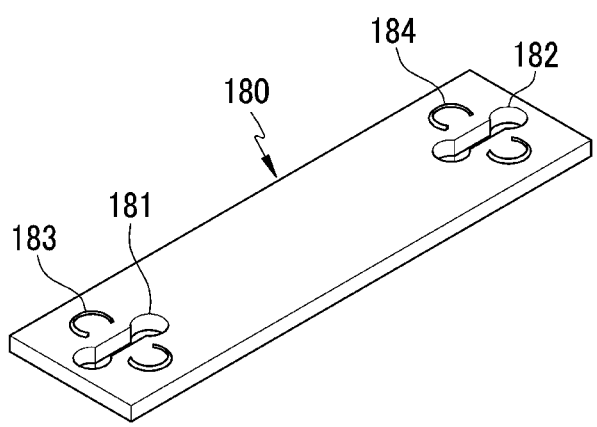
FIG. 20 is a perspective view of a bus bar according to the seventh exemplary embodiment of the present invention.

FIG. 19 is a partial perspective view of a battery module according to a seventh exemplary embodiment of the present invention, and FIG. 20 is a perspective view of a bus bar according to the seventh exemplary embodiment of the present invention.

Referring to FIGS. 19 and 20, the rechargeable battery 104 and the battery module according to the present exemplary embodiment have the same structures as the rechargeable battery and the battery module according to the aforementioned first exemplary embodiment, except for a first fixing terminal 83, a second fixing terminal 84, and a bus bar 180, so a repeated description of the same structure will be omitted.

The first fixing terminal 83 includes convex portions 83a having an arc-shaped cross-section and a plate portion 83b for connecting the convex portions 83a.

Two convex portions 83a are formed in the first fixing terminal 83, and the convex portions 83a are disposed to be separated from each other while interposing the plate portion 83b therebetween.

The plate portion 83b has a quadrangular plate shape, and the convex portions 83a are formed to protrude further in lateral directions of the plate portion 83b than the plate portion 83b.

The second fixing terminal 84 includes convex portions 84a having an arc-shaped cross-section and a plate portion 84b for connecting the convex portions 84a.

Two convex portions 84a are formed in the second fixing terminal 84, and the convex portions 84a are disposed to be separated from each other while interposing the plate portion 84b therebetween.

The plate portion 84b has a quadrangular plate shape, and the convex portions 84a are formed to protrude further in lateral directions of the plate portion 84b than the plate portion 84b.

A bus bar 180 has a quadrangular plate shape, and has a first connection hole 181 into which the first fixing terminal 83 installed in one rechargeable battery 104 is inserted and a second connection hole 182 into which the second fixing terminal 84 installed in the adjacent rechargeable battery 104 is inserted.

First supporting jaws 183 are formed in the bus bar 180 to support the first fixing terminal 83, and two first supporting jaws 183 are disposed to be separated from each other while interposing the first connection hole 181 therebetween.

The first supporting jaws 183 is formed to have an arc-shaped cross-section such that they can accommodate the convex portions 83a, and the convex portions 83a are inserted into an inner space of the first supporting jaws 183 when the first fixing terminal 83 is rotated.

In addition, second supporting jaws 184 are formed in the bus bar 180 to support the second fixing terminal 84, and two second supporting jaws 184 are disposed to be separated from each other while interposing the second connection hole 182 therebetween.

The first supporting jaws 184 are formed to have an arc-shaped cross-section such that they can accommodate the convex portions 84*a*, and the convex portions 84*a* are inserted into an inner space of the second supporting jaws 184 when the first fixing terminal 84 is rotated.

As described above, according to the current seventh exemplary embodiment, the convex portions are formed in the fixing terminals and the convex portions are inserted into the inner spaces of the supporting jaws, thereby reliably allowing the supporting jaws to support a wide area and thus preventing the fixing terminals from being rotated due to impacts.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A battery module comprising:
   a plurality of rechargeable batteries including a first lower terminal electrically coupled to an electrode assembly and a first fixing terminal installed to be movable with respect to the first lower terminal; and
   a plurality of bus bars for electrically coupling the plurality of rechargeable batteries, wherein a hole is formed in each of the bus bars to be inserted by the first fixing terminal, each of the bus bars having a top surface and a bottom surface formed on opposing sides of the bus bar, the hole in each of the bus bars extending from the top surface to the bottom surface, and the first fixing terminal contacts the top surface of a first one of the bus bars to support the first one of the bus bars,
   wherein the first one of the bus bars is configured to be removed from the first fixing terminal while the first fixing terminal remains connected to the first lower terminal.

2. The battery module of claim 1, wherein a fastening groove is formed in the lower terminal, and a rotation shaft is formed in the first fixing terminal to be inserted into the fastening groove.

3. The battery module of claim 2, wherein a supporting protrusion is formed to protrude at an external circumferential surface of the rotation shaft, and a supporting groove is formed in the fastening groove to be inserted by the supporting protrusion.

4. The battery module of claim 2, wherein a supporting protrusion is formed to protrude at an inner side of the fastening groove, and a supporting groove is formed at an external circumferential surface of the rotation shaft to be fitted into the supporting protrusion.

5. The battery module of claim 1, wherein the first fixing terminal has a plate shape, and a cutout is formed in the first fixing terminal to be inserted by the first lower terminal.

6. The battery module of claim 5, wherein a guide protrusion is formed to protrude at an inner side of the cutout, and a guide groove is formed at an outer surface of the first fixing terminal to be inserted by the guide protrusion.

7. The battery module of claim 5, wherein a guide protrusion is formed to protrude at an outer side of the first fixing terminal, and a guide groove is formed at an inner side of the cutout to be inserted by the guide protrusion.

8. The battery module of claim 1, wherein the first fixing terminal and the first lower terminal are combined by a connecting rod, and the connecting rod is integrally formed with the first fixing terminal and the first lower terminal and is twist-deformed.

9. The battery module of claim 1, wherein the first fixing terminal has an anisotropic cross-section, and the first lower terminal has a cylindrical shape.

10. The battery module of claim 9, wherein the first fixing terminal has a quadrangular plate shape.

11. The battery module of claim 10, further comprising:
    a plate terminal fixed to the first lower terminal by welding, wherein the plate terminal is disposed to be separated from the first fixing terminal.

12. The battery module of claim 1, wherein supporting jaws are formed in the first one of the bus bars to contact lateral sides of the first fixing terminal and to control rotation thereof.

13. The battery module of claim 1, wherein a pressing protrusion is formed to protrude toward the first one of the bus bars at a bottom surface of the first fixing terminal that contacts the first one of the bus bars, and a recess portion is formed in the first one of the bus bars to be inserted by the pressing protrusion.

14. The battery module of claim 1, wherein a pressing protrusion is formed to protrude toward the first one of the bus bars at a bottom surface of the first fixing terminal contacting the first one of the bus bars, two supporting jaws are formed in the first one of the bus bars to be separated from each other, and the pressing protrusion is inserted between the supporting jaws.

15. The battery module of claim 1, wherein a confining member is formed in the first one of the bus bars, the confining member has blocking jaws that are disposed to be separated from each other, and a mounting groove is formed between the blocking jaws.

16. The battery module of claim 15, wherein a bottom of the mounting groove is formed such that the bottom of the mounting groove is higher than the top surface of the first one of the bus bars.

17. The battery module of claim 1, wherein supporting jaws having an arc-shaped cross-section are formed in the first one of the bus bars, and the first fixing terminal is formed with a convex portion that is inserted into an inner space between the supporting jaws and has an arc-shaped cross-section.

18. The battery module of claim 1, wherein the first one of the bus bars is configured to be removed from the first fixing terminal when the first fixing terminal is rotated around an axis at a first angle and wherein the first fixing terminal is configured to fix the first one of the bus bars to a first one of the plurality of rechargeable batteries when the first fixing terminal is rotated around the axis at a second angle different from the first angle.

* * * * *